US010536074B2

(12) United States Patent
Hashimoto et al.

(10) Patent No.: US 10,536,074 B2
(45) Date of Patent: Jan. 14, 2020

(54) POWER FACTOR CORRECTING CONVERTER

(71) Applicant: PANASONIC INTELLECTUAL PROPERTY MANAGEMENT CO., LTD., Osaka (JP)

(72) Inventors: Takao Hashimoto, Osaka (JP); Takuya Ishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/455,615

(22) Filed: Jun. 27, 2019

(65) Prior Publication Data

US 2019/0326810 A1 Oct. 24, 2019

Related U.S. Application Data

(63) Continuation of application No. PCT/JP2017/046280, filed on Dec. 25, 2017.

(30) Foreign Application Priority Data

Jan. 6, 2017 (JP) ................................. 2017-001342

(51) Int. Cl.
*H02M 1/42* (2007.01)
*H02J 7/04* (2006.01)
*H02M 7/219* (2006.01)
*H02M 1/00* (2006.01)

(52) U.S. Cl.
CPC ........... *H02M 1/4225* (2013.01); *H02J 7/041* (2013.01); *H02M 7/219* (2013.01); *H02M 2001/0003* (2013.01)

(58) Field of Classification Search
CPC ............... H02M 1/4225; H02M 7/219; H02M 2001/0003; H02J 7/041
See application file for complete search history.

(56) References Cited

U.S. PATENT DOCUMENTS 10,008,945 B2 * 6/2018 Satoh ...................... H02M 1/08
2015/0180330 A1 6/2015 Ye

FOREIGN PATENT DOCUMENTS

JP 2011-198837 A 10/2011
JP 2015-139301 A 7/2015

OTHER PUBLICATIONS

International Search Report and Written Opinion issued in International Patent Application No. PCT/JP2017/046280, dated Feb. 20, 2018; with partial English translation.

* cited by examiner

*Primary Examiner* — Adolf D Berhane
*Assistant Examiner* — Afework S Demisse
(74) *Attorney, Agent, or Firm* — McDermott Will & Emery LLP

(57) ABSTRACT

A power-factor correcting converter includes: a series circuit including a first higher-potential switch and a first lower-potential switch connected in series to each other; and another series circuit including a second higher-potential switch and a second lower-potential switch connected in series to each other. In a positive phase period of the input AC voltage, a control circuit turns off the second higher-potential switch, turns on the second lower-potential switch, and alternately turns on and off the first lower-potential switch as a master switch and the first higher-potential switch as a slave switch. In a negative phase period of the input AC voltage, the control circuit reverses the on/off operation and the master/slave relationship, and turns on and off only the master switch and turns off the slave switch when the absolute value of the input AC voltage is smaller than or equal to a predetermined value.

14 Claims, 16 Drawing Sheets

POSITIVE PHASE
MASTER SWITCH (32): ON
SLAVE SWITCH (31): OFF

POSITIVE PHASE
MASTER SWITCH (32): OFF
SLAVE SWITCH (31): ON

NEGATIVE PHASE
MASTER SWITCH (31): ON
SLAVE SWITCH (32): OFF

NEGATIVE PHASE
MASTER SWITCH (31): OFF
SLAVE SWITCH (32): ON

POSITIVE PHASE
MASTER SWITCH (32): OFF
SLAVE SWITCH (31): OFF

NEGATIVE PHASE
MASTER SWITCH (31): OFF
SLAVE SWITCH (32): OFF

POSITIVE PHASE (REVERSE FLOW)
MASTER SWITCH (31): OFF
SLAVE SWITCH (32): ON

REVERSE FLOW OCCURS

NO REVERSE FLOW

REVERSE FLOW RESULTING
FROM RECOVERY CURRENT

SATISFACTORY RECOVERY CHARACTERISTICS

POSITIVE PHASE
ALL SWITCHES (31 TO 34): OFF

NEGATIVE PHASE
ALL SWITCHES (31 TO 34): OFF

POSITIVE PHASE
MASTER SWITCH (32): OFF
SLAVE SWITCH (31): ON
SECOND SERIES CIRCUIT (33, 34): OFF

NEGATIVE PHASE
MASTER SWITCH (31): OFF
SLAVE SWITCH (32): ON
SECOND SERIES CIRCUIT (33, 34): OFF

POWER FACTOR CORRECTING CONVERTER

CROSS REFERENCE TO RELATED APPLICATIONS

This application is a U.S. continuation application of PCT International Patent Application Number PCT/JP2017/046280 filed on Dec. 25, 2017, claiming the benefit of priority of Japanese Patent Application Number 2017-001342 filed on Jan. 6, 2017, the entire contents of which are hereby incorporated by reference.

BACKGROUND

1. Technical Field

The present disclosure relates to a power-factor correcting converter having the function of converting AC input voltage into desired output DC voltage and shaping the input AC current waveform.

2. Description of the Related Art

In recent years, to suppress harmonic current, a power-factor correcting converter that corrects the power factor by shaping an input current waveform in such a way that the input current waveform follows an input AC voltage waveform is frequently used as an input section of a power source circuit connected to an AC input. In a typical power-factor correcting converter, a bridge diode rectifies input AC voltage, and a boost converter is then used to perform power factor correction control. However, in a case where a large amount of electric power is handled, in particular, conduction loss in the bridge diode degrades the efficiency of the power-factor correcting converter and prevents reduction in size of the power-factor correcting converter. To avoid the problems, for example, United States Patent Application Publication No. 2015/0180330 (hereinafter referred to as Patent Literature 1) proposes a power-factor correcting converter with no bridge diode.

FIGS. 15A and 15B are each a circuit configuration diagram of the power-factor correcting converter described in Patent Literature 1. The converter configurations shown in FIGS. 15A and 15B are called totem-pole-type bridgeless power factor correction (PFC) in which higher-potential switch circuit 731 and lower-potential switch circuit 732 alternately perform high-frequency switching on inductor 702 provided in an input AC power source line.

In FIG. 15A, when the phase of input AC voltage Vi is positive, lower-potential switch circuit 732 is turned on and off as a master switch, and higher-potential switch circuit 731 operates as a slave switch that serves as a synchronous rectifier. Lower-potential diode 742 conducts current at the same time. When lower-potential switch circuit 732 operates in the turned-on state (higher-potential switch circuit 731 operates in turned-off state), current flows along the following path: input AC power source 701→inductor 702→lower-potential switch circuit 732→lower-potential diode 742→input AC power source 701, so that energy is accumulated in the inductor. Thereafter, when lower-potential switch circuit 732 operates in the turned-off state (higher-potential switch circuit 731 operates in turned-on state), current flows along the following path: input AC power source 701→inductor 702→higher-potential switch circuit 731→output capacitor 704→lower-potential diode 742→input AC power source 701, so that the energy accumulated in inductor 702 is discharged as charging current to output capacitor 704.

When the phase of input AC voltage Vi is negative, higher-potential switch circuit 731 operates as the master switch, lower-potential switch circuit 732 operates as the slave switch that serves as a synchronous rectifier, and higher-potential diode 741 conducts current. When higher-potential switch circuit 731 operates in the turned-on state (lower-potential switch circuit 732 operates in turned-off state), current flows along the following path: input AC power source 701→higher-potential diode 741→higher-potential switch circuit 731→inductor 702→input AC power source 701, so that energy is accumulated in inductor 702. Thereafter, when higher-potential switch circuit 731 operates in the turned-off state (lower-potential switch circuit 732 operates in turned-on state), current flows along the following path: input AC power source 701→higher-potential diode 741→output capacitor 704→lower-potential switch circuit 732→inductor 702→input AC power source 701, so that the energy accumulated in inductor 702 is discharged as charging current to the output capacitor.

As described above, in the configuration using bridge diodes, reducing the number of diodes present in the current path allows reduction in conduction loss.

In FIG. 15B, higher-potential diode 741 in FIG. 15A is replaced with higher-potential switch circuit 733, lower-potential diode 742 is replaced with lower-potential switch circuit 734, and higher-potential switch circuit 733 and lower-potential switch circuit 734 alternately perform switching in accordance with the phase of input AC voltage Vi. The configuration described above allows omission of diodes present in the current path and further reduction in conduction loss for efficiency improvement and size reduction.

SUMMARY

A power-factor correcting converter entirely including switch circuits, such as the power-factor correcting converter shown in FIG. 15B, however, experiences the following phenomenon in a period in which the input AC voltage is close to zero: the energy accumulated in the period for which the master switch operates in the turned-on state decreases and the energy discharged in the period for which the master switch operates in the turned-off state increases, so that the current flowing through inductor 702 flows in the reverse direction. Therefore, although the average current flowing through inductor 702 is close to zero, current flows in the positive and negative directions to increase the effective value of the current, resulting in a problem of an increase in conduction loss due to the on-resistance of the switch circuits.

In view of the situation described above, an object of the present disclosure is to provide a power-factor correcting converter including four switch circuits and capable of improving the efficiency of the power-factor correcting converter by suppressing reverse flow of inductor current in the vicinity of the zero cross point of input AC voltage.

In order to achieve the above-described object, in accordance with an aspect of the present disclosure, there is provided a power-factor correcting converter including: an inductor connected in series to an input AC power source that supplies input AC voltage via a first power source terminal and a second power source terminal; a bridge circuit including four switch circuits each having a turned-on state in which bidirectional conduction is achieved and a turned-off state in which unidirectional conduction is achieved in accordance with a drive signal to a control terminal; an output capacitor; and a control circuit that turns on and off each of the four switch circuits, wherein the bridge circuit includes a first series circuit that is a circuit including a first higher-potential switch circuit and a first lower-potential switch circuit, the first higher-potential switch circuit and the first lower-potential switch circuit being connected to a first input terminal and connected in series to each other, and a second series circuit that is a circuit including a second higher-potential switch circuit and a second lower-potential switch circuit, the second higher-potential switch circuit and the second lower-potential switch circuit being connected to a second input terminal and connected in series to each other, and a series circuit including the inductor and the input AC power source is disposed between and connected to the first input terminal and the second input terminal in such a way that the first power source terminal is connected to the first input terminal or the second power source terminal is connected to the second input terminal, the first series circuit, the second series circuit, and the output capacitor are connected in parallel to one another, voltage across the output capacitor is output as output DC voltage, and in a positive phase period of the input AC voltage when potential of the first power source terminal is higher than potential of the second power source terminal, the control circuit (i) turns off the second higher-potential switch circuit, turns on the second lower-potential switch circuit, and turns on and off the first lower-potential switch circuit as a master switch, (ii) alternately turns on and off the first higher-potential switch circuit as a slave switch and the first lower-potential switch circuit when an absolute value of the input AC voltage is greater than a first predetermined value, and (iii) turns off the first higher-potential switch circuit that is the slave switch when the absolute value of the input AC voltage is smaller than or equal to the first predetermined value, and in a negative phase period of the input AC voltage when the potential of the second power source terminal is higher than the potential of the first power source terminal, the control circuit (i) turns on the second higher-potential switch circuit, turns off the second lower-potential switch circuit, and turns on and off the first higher-potential switch circuit as the master switch, (ii) alternately turns on and off the first lower-potential switch circuit as the slave switch and the first higher-potential switch circuit when the absolute value of the input AC voltage is greater than the first predetermined value, and (iii) turns off the second lower-potential switch circuit that is the slave switch when the absolute value of the input AC voltage is smaller than or equal to the first predetermined value.

The configuration described above, in which the slave switch circuit is turned off and operates as a diode in the vicinity of the zero cross point of the input AC voltage, prevents reverse flow of inductor discharge current. The effective value of the inductor current is therefore reduced, and conduction loss decreases accordingly, whereby the efficiency of the power-factor correcting converter can be improved.

It is also possible that the first predetermined value is set at $(1-\delta_{max}) \times Vo$, where $\delta_{max}$ represents a maximum time ratio that is a maximum of a time ratio that is a proportion of a turned-on period to one switching cycle of the master switch that is the first lower-potential switch circuit in the positive phase period or the first higher-potential switch circuit in the negative phase period, and Vo represents the output DC voltage.

A region of the input AC voltage that is the region where the reverse flow phenomenon can occur can therefore be reliably eliminated.

It is further possible that the first higher-potential switch circuit and the first lower-potential switch circuit are each a transistor having the control terminal, a first terminal, and a second terminal, that the turned-on state is a state in which bidirectional conduction between the first terminal and the second terminal is achieved when voltage at the control terminal with respect to the first terminal is greater than or equal to a first threshold, and that the turned-off state is a state in which unidirectional conduction from the first terminal to the second terminal is achieved when the voltage at the control terminal is smaller than the first threshold and the voltage at the control terminal with respect to the second terminal is greater than or equal to a second threshold.

Therefore, since the current flows through the channel instead of a body diode in each of the switch circuits, the switch circuits each excels in a recovery characteristic and has a further enhanced reverse flow prevention function.

It is still further possible that the first higher-potential switch circuit and the first lower-potential switch circuit each include a semiconductor laminate including a first nitride semiconductor layer disposed on a substrate and a second nitride semiconductor layer disposed on the first nitride semiconductor layer and having a bandgap wider than a bandgap of the first nitride semiconductor layer, that the control terminal disposed on the semiconductor laminate, and that the first terminal and the second terminal disposed on the semiconductor laminate and on opposite sides of the control terminal.

It is still further possible that the first nitride semiconductor layer comprises $In_XGa_{(1-X)}N$, where X is in a range from 0 to 1, inclusive, and that the second nitride semiconductor layer comprises $Al_YIn_ZGa_{(1-Y-Z)}N$, where each of Y and Z is in a range from 0 to 1, inclusive.

Therefore, a channel layer in which electrons travel comprises a nitride semiconductor, and the channel layer includes a field effect transistor comprising a two-dimensional electron gas.

It is still further possible that the first higher-potential switch circuit and the first lower-potential switch circuit each include no parasitic element that is disposed between the first terminal and the second terminal and operates as a diode.

It is still further possible that the control circuit turns off both the second higher-potential switch circuit and the second lower-potential switch circuit when the absolute value of the input AC voltage is smaller than or equal to a second predetermined value.

It is still further possible that the second predetermined value is so set as to be equal to the first predetermined value.

Therefore, when the absolute value of the input AC voltage is smaller than or equal to the first predetermined value and the second predetermined value, the slave switch circuit and the second higher-potential switch circuit and the second lower-potential switch circuit, which form the second series circuit, are all turned off, and two diodes are therefore present in series in the inductor current discharge path in the turned-off state of the master switch circuit, whereby the reverse flow prevention function is further enhanced.

In order to achieve the above-described object, in accordance with another aspect of the present disclosure, there is provided a power-factor correcting converter including: an inductor connected in series to an input AC power source that supplies input AC voltage via a first power source terminal and a second power source terminal; a bridge circuit including four switch circuits each having a turned-on state in which bidirectional conduction is achieved and a turned-off state in which unidirectional conduction is achieved in accordance with a drive signal to a control terminal; an output capacitor; and a control circuit that turns on and off each of the four switch circuits, wherein the bridge circuit includes a first series circuit that is a circuit including a first higher-potential switch circuit and a first lower-potential switch circuit, the first higher-potential switch circuit and the first lower-potential switch circuit being connected to a first input terminal and connected in series to each other, and a second series circuit that is a circuit including a second higher-potential switch circuit and a second lower-potential switch circuit, the second higher-potential switch circuit and the second lower-potential switch circuit being connected to a second input terminal and connected in series to each other, and a series circuit including the inductor and the input AC power source is disposed between and connected to the first input terminal and the second input terminal in such a way that the first power source terminal is connected to the first input terminal or the second power source terminal is connected to the second input terminal, the first series circuit, the second series circuit, and the output capacitor are connected in parallel to one another, voltage across the output capacitor is output as output DC voltage, and in a positive phase period of the input AC voltage when potential of the first power source terminal is higher than potential of the second power source terminal, the control circuit (i) alternately turns on and off the first lower-potential switch circuit as a master switch and the first higher-potential switch circuit as a slave switch, (ii) turns off the second higher-potential switch circuit and turns on the second lower-potential switch circuit when an absolute value of the input AC voltage is greater than a second predetermined value, and (iii) turns off both the second higher-potential switch circuit and the second lower-potential switch circuit when the absolute value of the input AC voltage is smaller than or equal to the second predetermined value, and in a negative phase period of the input AC voltage when potential of the second power source terminal is higher than potential of the first power source terminal, the control circuit (i) alternately turns on and off the first higher-potential switch circuit as the master switch and the first lower-potential switch circuit as the slave switch, (ii) turns on the second higher-potential switch circuit and turns off the second lower-potential switch circuit when the absolute value of the input AC voltage is greater than the second predetermined value, and (iii) turns off both the second higher-potential switch circuit and the second lower-potential switch circuit when the absolute value of the input AC voltage is smaller than or equal to the second predetermined value.

The configuration described above, in which the switch circuits of the second series circuit are both turned off and one of the switch circuits operates as a diode in the inductor discharge current path in the vicinity of the zero cross point of the input AC voltage, prevents reverse flow of inductor discharge current. The effective value of the inductor current is therefore reduced, and conduction loss decreases accordingly, whereby the efficiency of the power-factor correcting converter can be improved.

It is possible that the second predetermined value is set at $(1-\delta_{max}) \times Vo$, where $\delta_{max}$ represents a maximum time ratio that is a maximum of a time ratio $\delta$ that is a proportion of a turned-on period to one switching cycle of the master switch that is the first lower-potential switch circuit in the positive phase period or the first higher-potential switch circuit in the negative phase period, and Vo represents the output DC voltage.

A region of the input AC voltage that is the region where the reverse flow phenomenon can occur can therefore be reliably eliminated.

It is also possible that the second higher-potential switch circuit and the second lower-potential switch circuit are each a transistor having the control terminal, a first terminal, and a second terminal, that the turned-on state is a state in which bidirectional conduction between the first terminal and the second terminal is achieved when voltage at the control terminal with respect to the first terminal is greater than or equal to a first threshold, and that the turned-off state is a state in which unidirectional conduction from the first terminal to the second terminal is achieved when the voltage at the control terminal with respect to the first terminal is smaller than the first threshold and the voltage at the control terminal with respect to the second terminal is greater than or equal to a second threshold.

Therefore, since the current flows through the channel instead of a body diode in each of the switch circuits, the switch circuits each excels in a recovery characteristic and has a further enhanced reverse flow prevention function.

It is further possible that the second higher-potential switch circuit and the second lower-potential switch circuit each include a semiconductor laminate including a first nitride semiconductor layer disposed on a substrate and a second nitride semiconductor layer disposed on the first nitride semiconductor layer and having a bandgap wider than a bandgap of the first nitride semiconductor layer, the control terminal disposed on the semiconductor laminate, and the first terminal and the second terminal disposed on the semiconductor laminate and on both sides of the control terminal.

It is still further possible that the first nitride semiconductor layer comprises $In_XGa_{(1-X)}N$, where X is in a range from 0 to 1, inclusive, and the second nitride semiconductor layer comprises $Al_YIn_ZGa_{(1-Y-Z)}N$, where each of Y and Z is in a range from 0 to 1, inclusive.

Therefore, a channel layer in which electrons travel comprises a nitride semiconductor, and the channel layer includes a field effect transistor comprising a two-dimensional electron gas.

It is still further possible that the second higher-potential switch circuit and the second lower-potential switch circuit each include no parasitic element that is disposed between the first terminal and the second terminal and operates as a diode.

The power-factor correcting converters according to the aspects of the present disclosure, in which any of the switch circuits in the inductor current discharge path is turned off and operates as a diode in the vicinity of the zero cross point of the input AC voltage, can prevent reverse flow of inductor discharge current. The effective value of the inductor current is therefore reduced, and conduction loss decreases accordingly, whereby the efficiency of the power-factor correcting converter can be improved.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Embodiment 1

The following describes the power-factor correcting converter according to Embodiment 1 of the present disclosure with reference to the drawings.

Figure 1:
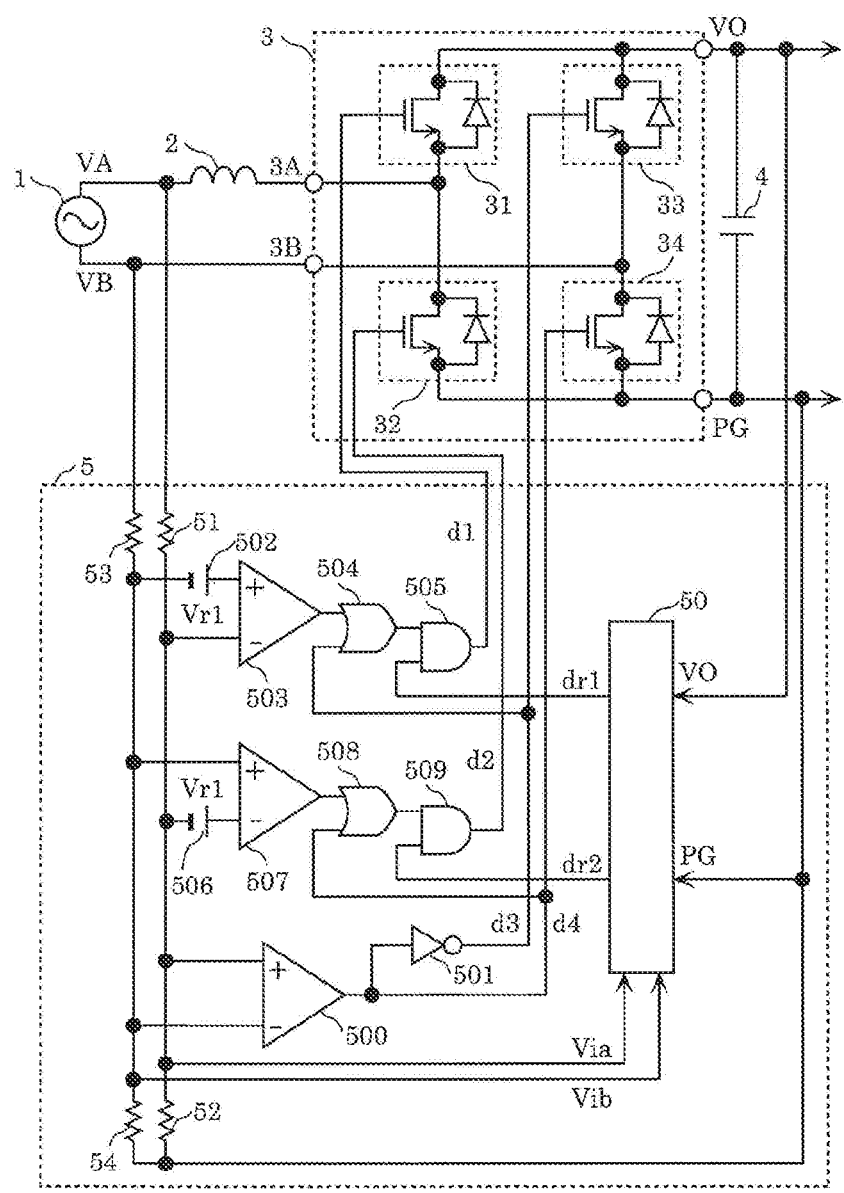
FIG. 1 is a circuit configuration diagram of a power-factor correcting converter according to Embodiment 1.

FIG. 1 is a circuit configuration diagram of a power-factor correcting converter according to Embodiment 1. The power-factor correcting converter according to the present embodiment includes inductor 2, bridge circuit 3, output capacitor 4, and control circuit 5, as shown in FIG. 1.

Input AC power source 1 is connected to first power source terminal VA and second power source terminal VB and outputs input AC voltage Vi to first power source terminal VA and second power source terminal VB. Inductor 2 is connected in series to input AC power source 1. Bridge circuit 3 receives input AC voltage Vi at first input terminal 3A and second input terminal 3B via inductor 2. Output capacitor 4 is connected to output terminals VO and PG of bridge circuit 3 and outputs output DC voltage Vo. Bridge circuit 3 includes first higher-potential switch circuit 31, which is disposed between and connected to output terminal VO and first input terminal 3A, first lower-potential switch circuit 32, which is disposed between and connected to first input terminal 3A and output terminal PG, second higher-potential switch circuit 33, which is disposed between and connected to output terminal VO and second input terminal 3B, and second lower-potential switch circuit 34, which is disposed between and connected to second input terminal 3B and output terminal PG. A circuit in which first higher-potential switch circuit 31 and first lower-potential switch circuit 32 are connected in series to each other is called a first series circuit, and a circuit in which second higher-potential switch circuit 33 and second lower-potential switch circuit 34 are connected in series to each other is called a second series circuit.

In a case where the four switch circuits described above are each an IGBT, a diode is so connected in parallel to each of the switch circuits as to be oriented in the reverse conduction direction, as shown in FIG. 1. In a case where the switch circuits are each a MOSFET, the switch circuits each include a parasitic diode, such as a body diode. In a case where the four switch circuits described above each are a nitride semiconductor transistor, the switch circuits each include a diode connected in parallel in the reverse conduction direction in an equivalent manner, as in reverse transistor operation, which will be described later. That is, in a turned-on state in which voltage higher than or equal to a threshold is applied to the gate terminal of each of the switch circuits, the switch circuit operates in a bidirectional conduction mode in which the impedance between primary terminals, such as between the drain and the source, is low, and even in a turned-off state in which the gate voltage is lower than the threshold, the switch circuit operates in a unidirectional conduction mode in which current flows from the source to the drain due to a decrease in drain voltage. In FIG. 1, the switch circuits are each drawn in the form of a MOSFET including a body diode as a representative example.

Control circuit 5 includes drive signal generation circuit 50 and resistors 51 to 54 for input voltage detection. The ratio of the resistance of resistor 51 to the resistance of resistor 52 and the ratio of the resistance of resistor 53 to the resistance of resistor 54 are set to be equal to each other (R51/R52=R53/R54). Drive signal generation circuit 50 detects input AC voltage Vi based on detection voltage Via, which is produced by dividing the voltage between the terminals VA and PG by resistors 51 and 52, and detection voltage Vib, which is produced by dividing the voltage between the terminals VB and PG by resistors 53 and 54. Drive signal generation circuit 50 then generates first reference drive signal dr1 for driving first higher-potential switch circuit 31 in switching drive operation at several tens of kilohertz or higher and second reference drive signal dr2 for driving first lower-potential switch circuit 32 in such a way that the input AC current follows the waveform of input AC voltage Vi with output DC voltage Vo substantially stabilized. First reference drive signal dr1 and second reference drive signal dr2 are high-frequency pulses having phases opposite each other and having very short deadtime for which the first and second series circuits simultaneously operate in the turned-off state at the time of switching, so that the first series circuit does not form a short circuit.

Control circuit 5 includes comparator 500, which determines an input phase based on whether detection voltage Via is higher than detection voltage Vib or vice versa, and inverter 501, which inverts the output from comparator 500. Output d3 from inverter 501 is a drive signal for driving second higher-potential switch circuit 33, and output d4 from comparator 500 is a drive signal for driving second lower-potential switch circuit 34. That is, control circuit 5 turns on second lower-potential switch circuit 34 and turns off second higher-potential switch circuit 33 when the phase of input AC voltage Vi is positive, that is, when the potential at first power source terminal VA is higher than the potential at second power source terminal VB (Via>Vib). Control circuit 5 turns on second higher-potential switch circuit 33 and turns off second lower-potential switch circuit 34 when the phase of input AC voltage Vi is negative, that is, when the potential at second power source terminal VB is higher than the potential at first power source terminal VA (Via<Vib).

Control circuit 5 further includes first reference voltage source 502, which generates first reference voltage Vr1, comparator 503, which compares detection voltage Via with voltage Vib+Vr1 obtained by adding first reference voltage Vr1 to detection voltage Vib, OR circuit 504, which outputs the logical sum of the output from comparator 503 and output d3 from inverter 501, and AND circuit 505, which outputs the logical product of the output from OR circuit 504 and first reference drive signal dr1. The output from AND circuit 505 is first drive signal d1 for driving first higher-potential switch circuit 31. That is, first drive signal d1 turns off first higher-potential switch circuit 31 in a period in which the phase of input AC voltage Vi is positive (Via>Vib) and Via−Vib<Vr1 and turns on and off first higher-potential switch circuit 31 in the other period with first reference drive signal dr1.

Control circuit 5 further includes second reference voltage source 506, which generates first reference voltage Vr1, comparator 507, which compares detection voltage Vib with voltage Via+Vr1 obtained by adding first reference voltage Vr1 to detection voltage Via, OR circuit 508, which outputs the logical sum of the output from comparator 507 and output d4 from comparator 500, and AND circuit 509, which outputs the logical product of the output from OR circuit 508 and second reference drive signal dr2. The output from AND circuit 509 is second drive signal d2 for driving first lower-potential switch circuit 32. That is, second drive signal d2 turns off first lower-potential switch circuit 32 in a period in which the phase of input AC voltage Vi is negative (Via<Vib) and Vib−Via<Vr1 and turns on and off first lower-potential switch circuit 32 in the other period with second reference drive signal dr2.

Since the drive signals are each an output from a comparator or a logical circuit, a level shift circuit or an amplifier for driving a higher-potential switch circuit is required to drive the actual switch circuit, but such a level shift circuit and amplifier are omitted for simplification of the description because these components are not essential components in the present disclosure. The same holds true for following Embodiments 2 and 3.

The operation of the thus configured power-factor correcting converter according to the present embodiment will be described below with reference to FIGS. 2 and 4A to 4C.

Figure 2:
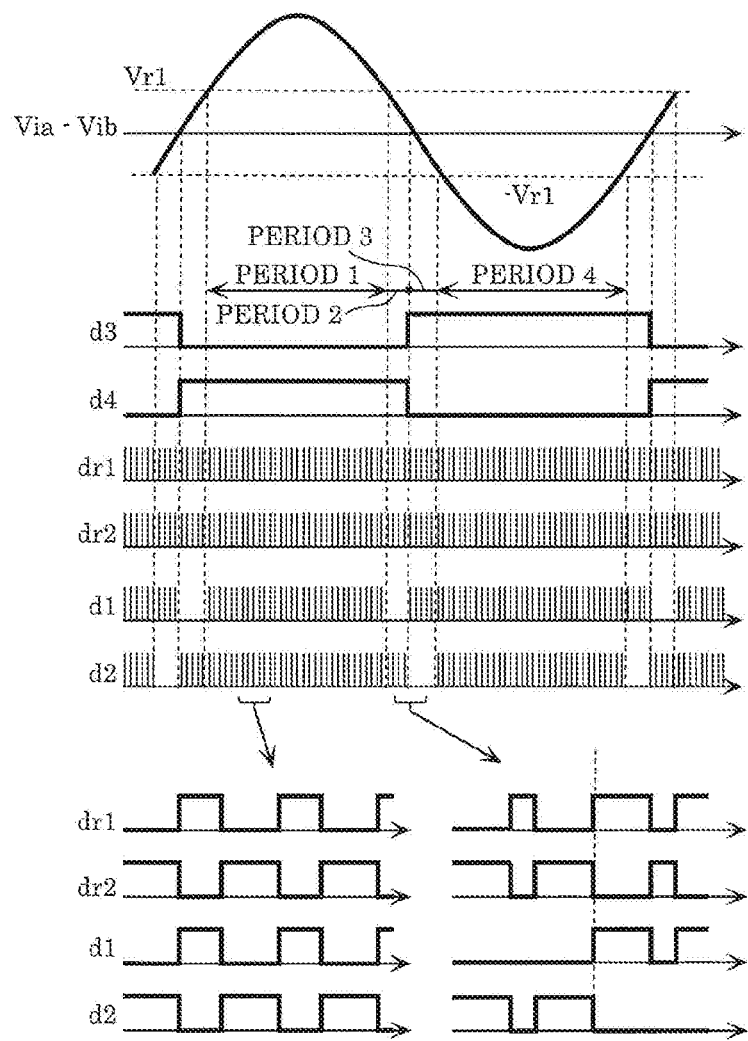
FIG. 2 shows waveforms of the operating power-factor correcting converter according to Embodiment 1.

FIG. 2 shows waveforms of the operating power-factor correcting converter according to Embodiment 1. FIG. 2 shows waveforms of key parts of the operating power-factor correcting converter shown in FIG. 1. Specifically, FIG. 2 shows detection voltage difference (Via−Vib) proportional to input AC voltage Vi, first reference voltage Vr1, third drive signal d3, fourth drive signal d4, first reference drive signal dr1, second reference drive signal dr2, first drive signal d1, and second drive signal d2 and further shows temporally enlarged waveforms of the signals dr1, dr2, d1, and d2 in periods 1 and 2 to 3 in FIG. 2.

Figure 3A:
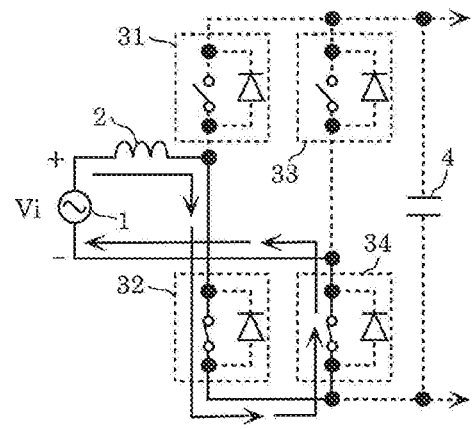
FIG. 3A shows the current path in the power-factor correcting converter according to Embodiment 1 in a positive-phase first state
Figure 3B:
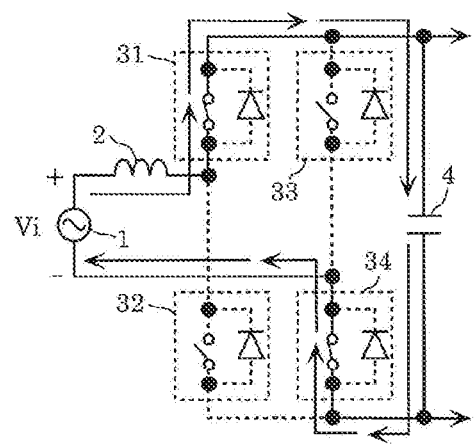
FIG. 3B shows the current path in the power-factor correcting converter according to Embodiment 1 in a positive-phase second state.
Figure 3C:
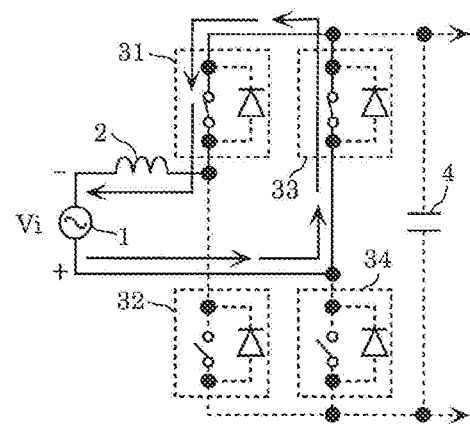
FIG. 3C shows the current path in the power-factor correcting converter according to Embodiment 1 in a negative-phase first state.
Figure 3D:
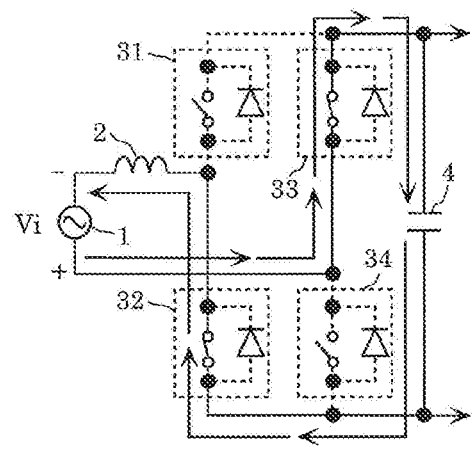
FIG. 3D shows the current path in the power-factor correcting converter according to Embodiment 1 in a negative-phase second state.

FIG. 3A shows the current path in the power-factor correcting converter according to Embodiment 1 in a positive-phase first state. FIG. 3B shows the current path in the power-factor correcting converter according to Embodiment 1 in a positive-phase second state. FIG. 3C shows the current path in the power-factor correcting converter according to Embodiment 1 in a negative-phase first state. FIG. 3D shows the current path in the power-factor correcting converter according to Embodiment 1 in a negative-phase second state.

Figure 4A:
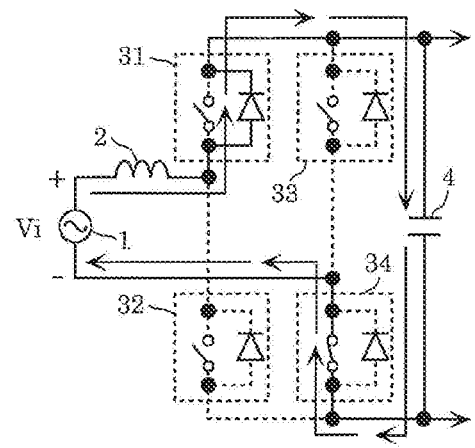
FIG. 4A shows the current path in the power-factor correcting converter according to Embodiment 1 in a positive-phase third state.
Figure 4B:
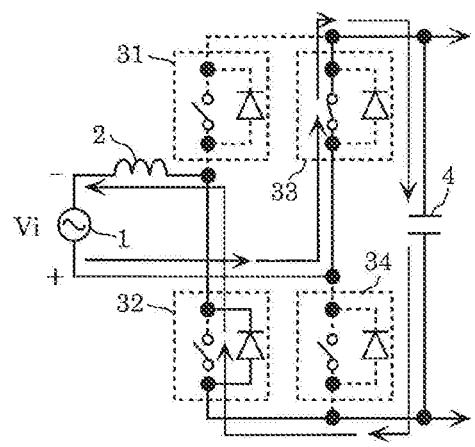
FIG. 4B shows the current path in the power-factor correcting converter according to Embodiment 1 in a negative-phase third state.
Figure 4C:
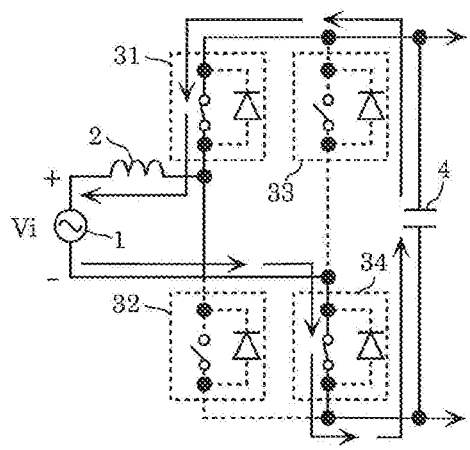
FIG. 4C shows the current path in the power-factor correcting converter according to Embodiment 1 in a positive-phase fourth state.

FIG. 4A shows the current path in the power-factor correcting converter according to Embodiment 1 in a positive-phase third state. FIG. 4B shows the current path in the power-factor correcting converter according to Embodiment 1 in a negative-phase third state. FIG. 4C shows the current path in the power-factor correcting converter according to Embodiment 1 in a positive-phase fourth state.

FIGS. 3A to 3D and FIGS. 4A to 4C each show the path along which inductor current flows in accordance with the states of the switch circuits. To express the turned-on and turned-off states, the switch circuits are each a circuit in which a switch and a diode are connected in parallel to each other. Also in following Embodiments 2 and 3, the current path is expressed in the same manner according to the states of the switch circuits.

Period 1 in FIG. 2 is a period in which the phase of input AC voltage Vi is positive (VA>VB, that is, Via>Vib) and input AC voltage Vi is greater than a first predetermined value (Via>Vib+Vr1). In this period, first drive signal d1 and second drive signal d2 are equal to first reference drive signal dr1 and second reference drive signal dr2, respectively, and first lower-potential switch circuit 32 and the first higher-potential switch circuit 31 are alternately turned on and off as the master switch and the slave switch, respectively. First, when first lower-potential switch circuit 32 operates in the turned-on state (first higher-potential switch circuit 31 operates in turned-off state) (in positive-phase first state), the current flows along the following path: input AC power source 1→inductor 2→first lower-potential switch circuit 32→second lower-potential switch circuit 34→input AC power source 1, so that energy is accumulated in inductor 2, as shown in FIG. 3A. Thereafter, when first lower-potential switch circuit 32 operates in the turned-off state (first higher-potential switch circuit 31 operates in turned-on state) (in positive-phase second state), the current flows along the following path: input AC power source 1→inductor 2→first higher-potential switch circuit 31→output capacitor 4→second lower-potential switch circuit 34→input AC power source 1, so that the energy accumulated in inductor 2 is discharged as charging current to output capacitor 4, as shown in FIG. 3B.

Conversely, period 4 in FIG. 2 is a period in which the phase of input AC voltage Vi is negative (VA<VB, that is, Via<Vib) and input AC voltage Vi is greater than the first predetermined value (Vib>Via+Vr1). In this period, first drive signal d1 and second drive signal d2 are equal to first reference drive signal dr1 and second reference drive signal dr2, respectively, and first higher-potential switch circuit 31 and the first lower-potential switch circuit 32 are alternately turned on and off as the master switch and the slave switch, respectively. First, when first higher-potential switch circuit 31 operates in the turned-on state (first lower-potential switch circuit 32 operates in turned-off state) (in negative-phase first state), the current flows along the following path: input AC power source 1→second higher-potential switch circuit 33→first higher-potential switch circuit 31→inductor 2→input AC power source 1, so that energy is accumulated in inductor 2, as shown in FIG. 3C. Thereafter, when first higher-potential switch circuit 31 operates in the turned-off state (first lower-potential switch circuit 32 operates in turned-on state) (in negative-phase second state), the current flows along the following path: input AC power source 1→second higher-potential switch circuit 33→output capacitor 4→first lower-potential switch circuit 32→inductor 2→input AC power source 1, so that the energy accumulated in inductor 2 is discharged as charging current to output capacitor 4, as shown in FIG. 3D. The operations in periods 1 and 4 described above are the same as the operation of the power-factor correcting converter of the related art.

Period 2 in FIG. 2 is a period in which the phase of input AC voltage Vi is positive and input AC voltage Vi is smaller than the first predetermined value (Via<Vib+Vr1). In this period, first drive signal d1 is fixed to a low level, and first higher-potential switch circuit 31 operates in the turned-off state. First, when first lower-potential switch circuit 32 operates in the turned-on state, the current flows along the following path: input AC power source 1→inductor 2→first lower-potential switch circuit 32→second lower-potential switch circuit 34→input AC power source 1, so that energy is accumulated in inductor 2, as in period 1. Thereafter, when the first lower-potential switch circuit 32 is turned off (positive-phase third state), the current flows along the following path: the input AC power source 1→inductor 2→the equivalent parallel diode in first higher-potential switch circuit 31→output capacitor 4→second lower-potential switch circuit 34→input AC power source 1, so that the energy accumulated in inductor 2 is discharged as charging current to output capacitor 4, as shown in FIG. 4A Since the equivalent parallel diode of first higher-potential switch circuit 31 is present in the inductor current discharge path, the reduced current does not go beyond zero but does not flow in the reverse direction even when input AC voltage Vi has a small absolute value.

Period 3 in FIG. 2 is a period in which the phase of input AC voltage Vi is negative and input AC voltage Vi is smaller than the first predetermined value (Vib<Via+Vr1). In this period, second drive signal d2 is fixed to the low level, and first lower-potential switch circuit 32 operates in the turned-off state. Therefore, when first higher-potential switch circuit 31 operates in the turned-on state, the current flows along the following path: input AC power source 1→second higher-potential switch circuit 33→first higher-potential switch circuit 31→inductor 2→input AC power source 1, so that energy is accumulated in inductor 2. Thereafter, when the first higher-potential switch circuit 31 is turned off (negative-phase third state), the current flows along the following path: the input AC power source 1→second higher-potential switch circuit 33→output capacitor 4→the equivalent parallel diode in first lower-potential switch circuit 32→inductor 2→input AC power source 1, so that the energy accumulated in inductor 2 is discharged as charging current to output capacitor 4, as shown in FIG. 4B. Since the equivalent parallel diode of first lower-potential switch circuit 32 is present in the inductor current discharge path, the reduced current does not go beyond zero but does not flow in the reverse direction.

Figure 5A:
FIG. 5A shows a current waveform diagram of the power-factor correcting converter of the related art.

Alternately turning on and off first higher-potential switch circuit 31 and first lower-potential switch circuit 32 also in the vicinity of the input zero cross point, as in the related art, causes the state in which the current flows along the reversed arrow in FIG. 3B, that is, the reverse flow phenomenon, for example, as shown in FIG. 4C. FIG. 5A shows the state described above in the form of a current waveform. FIG. 5A shows a current waveform diagram of the power-factor correcting converter of the related art.

Figure 5B:
FIG. 5B shows a current waveform diagram of the power-factor correcting converter according to Embodiment 1.

In contrast, the power-factor correcting converter according to the present embodiment has the function of comparing the absolute value of input AC voltage Vi under detection with the first predetermined value and fixing the switch circuit operating as the slave switch to the turned-off state in a case where the absolute value of input AC voltage Vi is smaller than the first predetermined value. FIG. 5B shows a current waveform diagram of the power-factor correcting converter according to Embodiment 1. The function described above can prevent reverse flow of the inductor current in the vicinity of the zero cross point of the input AC voltage, whereby the peak value and hence the effective value of the inductor current decreases, as shown in FIG. 5B. The conduction loss thus decreases, whereby the efficiency of the power-factor correcting converter can be improved.

The first predetermined value is desirably set at a value close to the voltage at which the inductor current starts flowing in the reverse direction. At the critical point corresponding to the first predetermined value, an increase in the inductor current in the turned-on period of the master switch circuit balances with a decrease in the inductor current in the turned-off period of the master switch circuit. Let Ei be an instantaneous absolute value of input AC voltage Vi, Ton be the turned-on period of the master switch circuit, Toff be the turned-off period of the master switch circuit, L be the inductance of inductor 2, and Vo be the output DC voltage, and Expression 1 is satisfied.

$$Ei \times Ton/L \approx (Vo-Ei) \times Toff/L \qquad \text{(Expression 1)}$$

Solving Expression 1 for Ei derives Expression 2.

$$Ei \approx Vo \times Toff/(Ton+Toff)=(1-\delta) \times Vo \qquad \text{(Expression 2)}$$

The symbol δ is the time ratio associated with the master switch circuit and is the proportion of the turned-on period that occupies one switching cycle. Control circuit 5 drives the master switch circuit, for example, in such a way that the time ratio δ increases as the absolute value of input AC voltage Vi decreases to substantially stabilize output DC voltage Vo, but a maximum time ratio $\delta_{max}$ is set because there is restriction of $\delta<1$. When absolute value Ei of input AC voltage Vi is smaller than $(1-\delta_{max})\times Vo$, an increase in the inductor current is greater than a decrease in the inductor current in the switching cycle, resulting in the reverse flow phenomenon. Therefore, let E1 be the first predetermined value, and first predetermined value E1 may be set as shown in Expression 3.

$$E1 \approx (1-\delta_{max}) \times Vo \qquad \text{(Expression 3)}$$

In the present embodiment, let R1 be the resistance of resistors 51 and 53, and R2 be the resistance of resistors 52 and 54, and the parameters are so set that Expression 4 is satisfied.

$$E1 = (1+R1/R2) \times Vr1 \qquad \text{(Expression 4)}$$

First higher-potential switch circuit 31 and first lower-potential switch circuit 32, which each switch at a high frequency of several tens of kilohertz or higher, desirably excel in switching characteristics and have a small amount of parasitic capacity. In a case where the switch circuits are each operated as a diode that is turned off in the vicinity of the input zero cross point to prevent the reverse flow, in particular, as in the present embodiment, the switch circuits desirably have not only small parasitic capacity but satisfactory recovery characteristics.

Figure 6A:
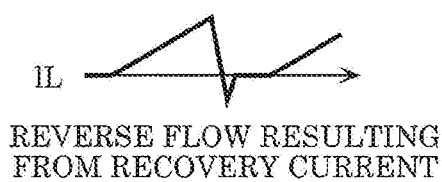
FIG. 6A shows the inductor current waveform in a no reverse flow condition in a case where recovery current flows.
Figure 6B:
FIG. 6B shows the inductor current waveform in the no reverse flow condition in a case where the amount of recovery current is small.

FIG. 6A shows the inductor current waveform in a no reverse flow condition in a case where recovery current flows, and FIG. 6B shows the inductor current waveform in the no reverse flow condition in a case where the amount of recovery current is small. Since such reverse flow increases the loss and causes noise, the magnitude of the reverse flow is desirably small, as shown in FIG. 6B.

The cause of the recovery current is the recovery characteristic and the parasitic capacity described above. In a PN-junction diode, there is a phenomenon in which current flows in the reverse direction for a period called a reverse recovery period after the current flowing in the forward direction becomes zero. The reverse recovery period is a period for which the carrier accumulated in the forward current conduction period maintains the conduction state even when the diode is reversely biased. A high-speed diode having satisfactory recovery characteristics is so manufactured as to have a short reverse recovery period and therefore characterized in that the magnitude of the recovery current, that is, the reverse flow is small. The parasitic capacity, which is the other cause of an increase in the reverse flow, is electrostatic capacity equivalently present across a turned-off switch circuit and corresponds, for example, to output capacity Coss, which is the sum of the drain-source capacity Cds and the drain-gate capacity Cdg, in the case of a MOSFET. When parasitic capacity is charged to the voltage present across the turned-off switch circuit, the charging current forms the reverse flow. Such recovery current has a greater magnitude when the reverse recovery period is longer or when the parasitic capacity is greater because the amount of charging electric charge increases.

That is, in the case where the unidirectional conduction mode of a switch circuit is achieved by a diode connected in an anti-parallel manner, such as in the case of an IGBT, a high-speed diode having satisfactory recovery characteristics is required. In a case where the unidirectional conduction mode is achieved by a parasitic body diode that is the PN junction, as in the case of a MOSFET, the body diode is required to have a structure having satisfactory recovery characteristics.

In contrast to the existing switch circuits described above, a nitride semiconductor transistor under development in recent years has an electron-traveling channel layer comprising a nitride semiconductor, and the channel layer has a structure formed of a two-dimensional electron gas.

Figure 7A:
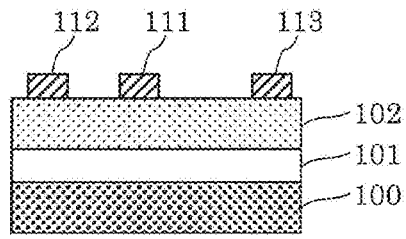
FIG. 7A shows an example of the cross-sectional structure of a lateral nitride semiconductor transistor.
Figure 7B:
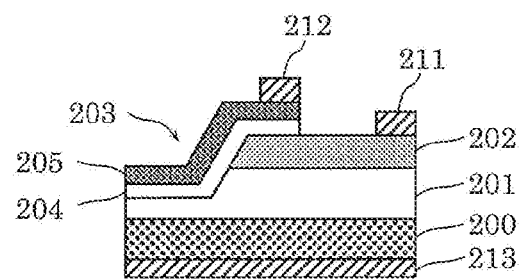
FIG. 7B shows an example of the cross-sectional structure of a longitudinal nitride semiconductor transistor.

FIG. 7A shows an example of the cross-sectional structure of a lateral nitride semiconductor transistor, and FIG. 7B shows an example of the cross-sectional structure of a longitudinal nitride semiconductor transistor. The lateral and longitudinal nitride semiconductor transistors each have no body diode, as shown in FIGS. 7A and 7B.

In FIG. 7A, first nitride semiconductor layer 101 comprising gallium nitride (GaN) and second nitride semiconductor layer 102 comprising aluminum gallium nitride (AlGaN), the bandgap of which is wider than that of gallium nitride, are sequentially layered on substrate 100. Gate electrode 111 is formed on second nitride semiconductor layer 102, and source electrode 112 and drain electrode 113 are formed on the opposite sides of gate electrode 111.

In FIG. 7B, nitride semiconductor layer 201, which comprises n-type GaN, and nitride semiconductor layer 202, which comprises p-type GaN formed on n-type nitride semiconductor layer 201, are sequentially formed and layered on substrate 200. Recess 203, which has a bottom that reaches n-type nitride semiconductor layer 201, is so provided as to pass through part of p-type nitride semiconductor layer 202. Further, first nitride semiconductor layer 204, which comprises GaN, and second nitride semiconductor layer 205, which comprises AlGaN, the bandgap of which is wider than that of first nitride semiconductor layer 204, are sequentially so formed as to cover the bottom and side of recess 203 and part of the front surface of p-type nitride semiconductor layer 202. Moreover, gate electrode 211 is formed on the front surface of p-type nitride semiconductor layer 202, source electrode 212 is formed as a layer above the second nitride semiconductor layer, and drain electrode 213 is formed on the rear surface of the substrate. Although the operation of the transistors will not be described in detail because the operation does not fall within the essentials of the present application, characteristics to be appealed in view of the structures described above are the following two points: a first point is the fact that there is no PN junction structure, that is, no body diode is present between the source electrode and the drain electrode. A second point is the fact that the source electrode and the drain electrode may be positionally swapped, that is, the transistors can each normally operate as a reverse transistor.

The first nitride semiconductor is gallium nitride (GaN), and the second nitride semiconductor is aluminum gallium nitride (AlGaN) in the above description. Instead, the first nitride semiconductor may be $In_XGa_{(1-X)}N$ ($0 \leq X \leq 1$), and the second nitride semiconductor may be $Al_YIn_ZGa_{(1-Y-Z)}N$ ($0 \leq Y \leq 1$, $0 \leq Z \leq 1$).

Figure 8:
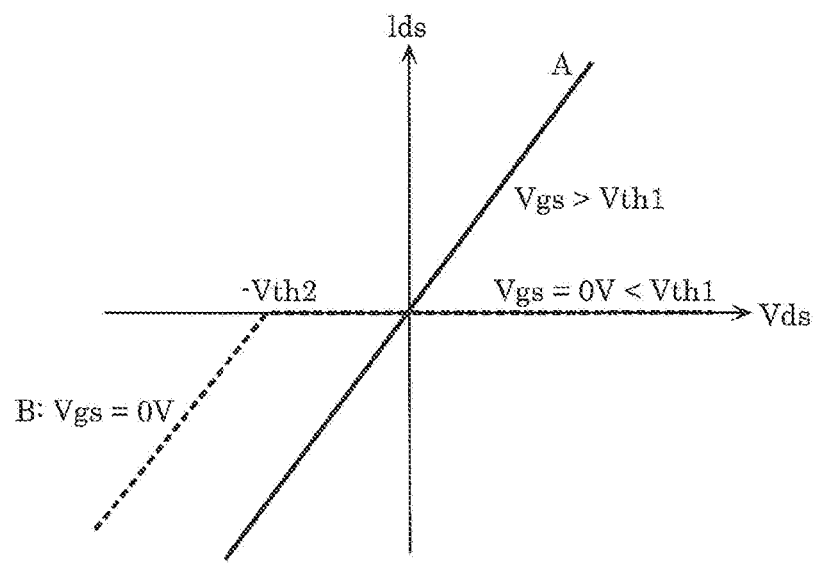
FIG. 8 shows the voltage-current characteristic of a nitride semiconductor transistor.

FIG. 8 shows the voltage-current characteristic of a nitride semiconductor transistor. Specifically, FIG. 8 shows an example of the Vds-Ids characteristic of the nitride semiconductor transistor described above. In a turned-on state in which gate-source voltage Vgs is sufficiently higher than first threshold Vth1, a bidirectional conduction state is achieved between the drain terminal and the source terminal, as indicated by straight line A in FIG. 8. On the other hand, in a turned-off state in which the gate-source voltage Vgs is smaller than first threshold Vth1 (Vgs=0 V) and when the gate-drain voltage Vgd (=Vgs−Vds) becomes greater than second threshold Vth2, a unidirectional conduction state in which primary current Ids flows from the source terminal to the drain terminal is achieved, as indicated by broken line B in FIG. 8.

As described above, the nitride semiconductor transistor operates in the unidirectional conduction mode, in which conduction is achieved via the channel as a reverse transistor, when the drain potential decreases to a predetermined threshold in the turned-off state, in which the gate and the source form a short circuit. In the unidirectional conduction mode, the transistor behaves as an anti-parallel diode similar to the body diode of a MOSFET, but no PN junction structure is present, and the carrier is formed only of electrons and no holes, whereby an ideal recovery characteristic with almost no reverse recovery period is achieved. Since the recovery current produced in such a nitride semiconductor transistor is produced only by structurally present parasitic capacity, the inductor current in the no reverse flow condition has a waveform with a small magnitude of reverse flow, as shown in FIG. 6B, whereby the loss and noise are effectively reduced. That is, when a switch circuit that operates as a diode is a field effect transistor in which the electron-traveling channel layer comprises a nitride semiconductor and the channel layer comprises a two-dimensional electron gas, the recovery current decreases, and the reverse flow prevention function is therefore further enhanced.

On the other hand, second higher-potential switch circuit 32 and second lower-potential switch circuit 34 are not required to perform high-frequency switching, but the voltage drop is desirably small when the switch circuits are turned on. A MOSFET that has large parasitic capacity but has small on-resistance may therefore be selected.

Embodiment 2

Figure 9:
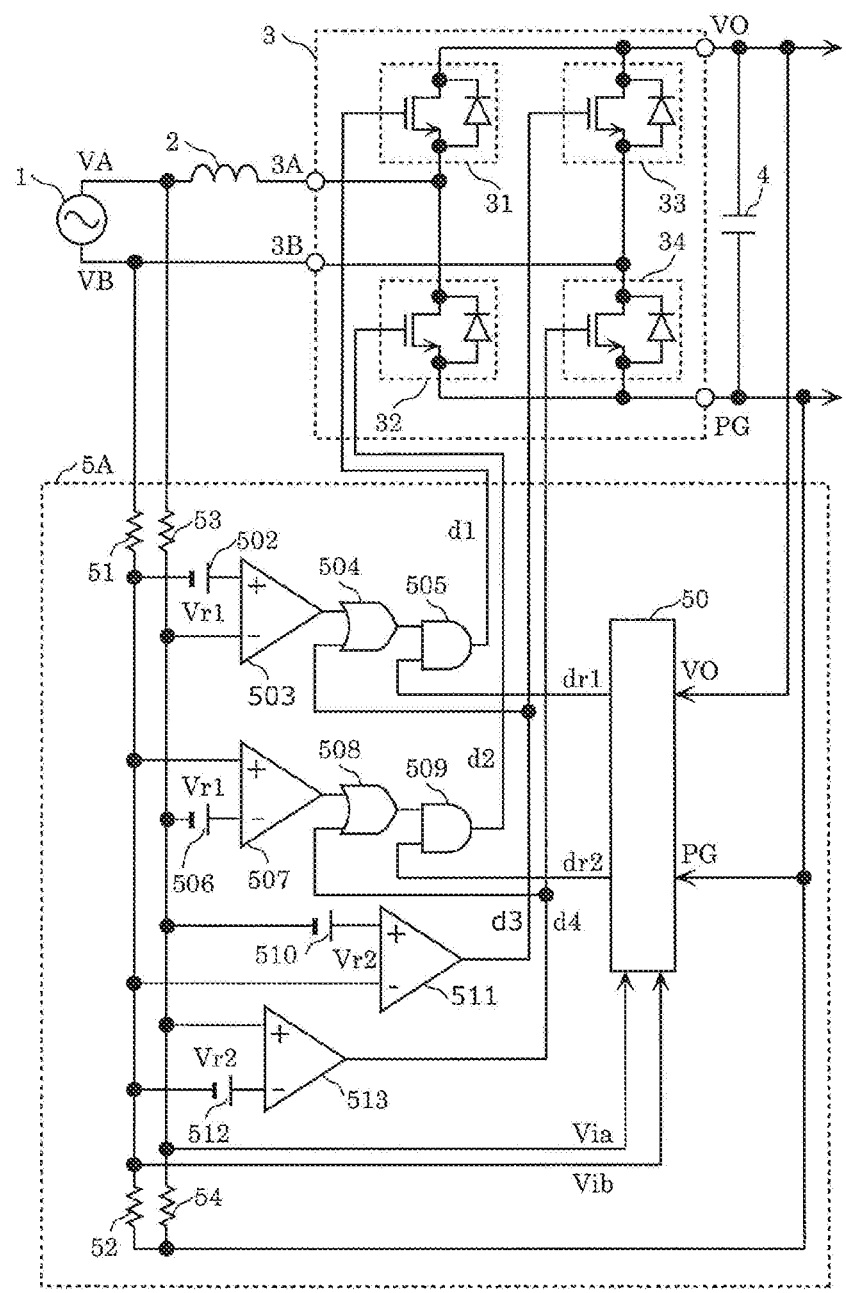
FIG. 9 is a circuit configuration diagram of a power-factor correcting converter according to Embodiment 2.
Figure 10:
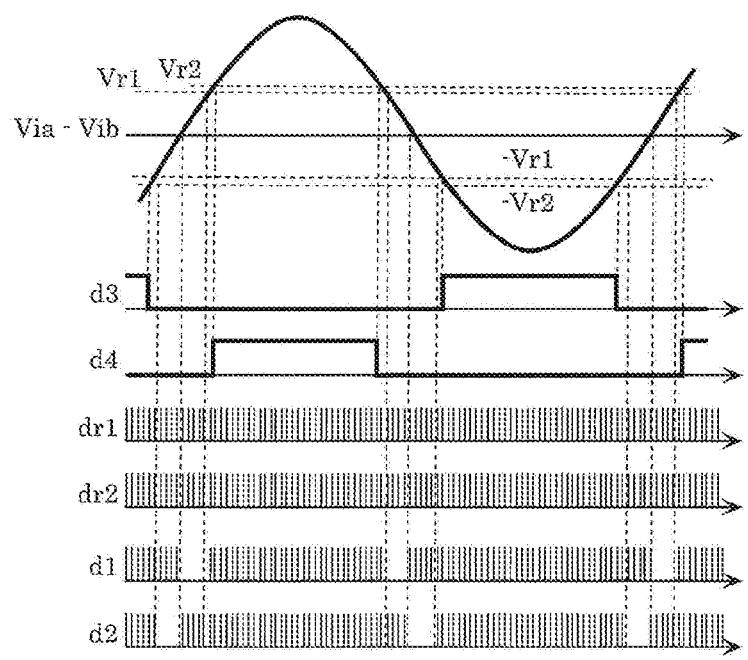
FIG. 10 shows waveforms of the operating power-factor correcting converter according to Embodiment 2.
Figure 11A:
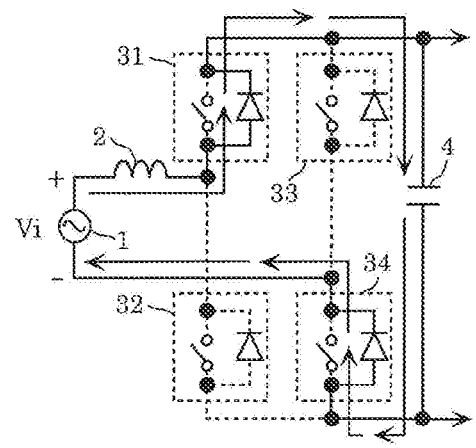
FIG. 11A shows the current path of the power-factor correcting converter according to Embodiment 2 in the case of the positive phase.
Figure 11B:
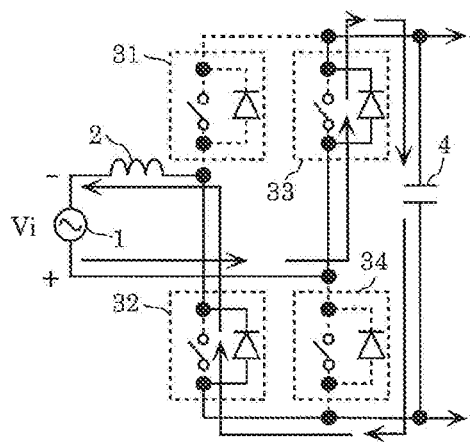
FIG. 11B shows the current path of the power-factor correcting converter according to Embodiment 2 in the case of the negative phase.

FIG. 9 is a circuit configuration diagram of a power-factor correcting converter according to Embodiment 2. FIG. 10 shows waveforms of the operating power-factor correcting converter according to Embodiment 2. FIG. 11A shows the current path of the power-factor correcting converter according to Embodiment 2 in the case of the positive phase, and FIG. 11B shows the current path of the power-factor correcting converter according to Embodiment 2 in the case of the negative phase. In FIG. 9, the same components as those of the power-factor correcting converter according to Embodiment 1 shown in FIG. 1 have the same reference numerals and will not be described. The power-factor correcting converter according to Embodiment 2 differs from the power-factor correcting converter according to Embodiment 1 in FIG. 1 in terms of the configuration of the control circuit, and the control circuit in the present embodiment is called control circuit 5A to be distinguished from control circuit 5 in Embodiment 1.

Control circuit 5A includes, in place of comparator 500 and inverter 501 of control circuit 5, third reference voltage source 510, which generates second reference voltage Vr2, comparator 511, which compares detection voltage Vib with voltage (Via+Vr2) obtained by adding second reference voltage Vr2 to detection voltage Via, fourth reference voltage source 512, which generates second reference voltage Vr2, and comparator 513, which compares detection voltage Via with voltage (Vib+Vr2) obtained by adding second reference voltage Vr2 to detection voltage Vib. Further, in control circuit 5A, the output from comparator 511 forms third drive signal d3 for driving second higher-potential switch circuit 33, and the output from comparator 513 forms fourth drive signal d4 for driving second lower-potential switch circuit 34.

FIG. 10 shows detection voltage difference (Via−Vib) proportional to input AC voltage Vi, first reference voltage Vr1, second reference voltage Vr2, third drive signal d3, fourth drive signal d4, first reference drive signal dr1, second reference drive signal dr2, first drive signal d1, and second drive signal d2. The following description will be made on the assumption that second reference voltage Vr2 is higher than first reference voltage Vr1, and whether first reference voltage Vr1 is greater than second reference voltage Vr2 or vice versa does not particularly matter to provide the effect of the present embodiment as described below.

That is, third drive signal d3 and fourth drive signal d4 each have the low level when the absolute value of input AC voltage Vi is smaller than the second predetermined value (|Via−Vib|<Vr2) and turn off second higher-potential switch circuit 33 and second lower-potential switch circuit 34, as shown in FIG. 10.

According to the configuration described above, the operation of the power-factor correcting converter according to Embodiment 2 is the same as the operation of the power-factor correcting converter according to Embodiment 1 when the absolute value of input AC voltage Vi is greater than the second predetermined value (|Via−Vib|>Vr2). On the other hand, when the absolute value of input AC voltage Vi is smaller than the second predetermined value, second higher-potential switch circuit 33 and second lower-potential switch circuit 34 are both turned off. As a result, during the on/off operation of first higher-potential switch circuit 31 and first lower-potential switch circuit 32, the equivalent parallel diode of second higher-potential switch circuit 33 or the equivalent parallel diode of second lower-potential switch circuit 34 is present in the path along which the inductor current flows. The equivalent parallel diode present in the path therefore prevents the reverse flow of the inductor current. Further, when the absolute value of input AC voltage Vi becomes smaller than the first predetermined value, first higher-potential switch circuit 31 or first lower-potential switch circuit 32 is turned off. FIG. 11A shows the inductor current discharge path in a case where the absolute value of input AC voltage is smaller than the first and second predetermined values and all the switch circuits operate in the turned-off state in the case of the positive phase. FIG. 11B shows the inductor current discharge path in a case where the absolute value of input AC voltage is smaller than the first and second predetermined values and all the switch circuits operate in the turned-off state in the case of the negative phase. Two diodes are present in series in the inductor current discharge path, as shown in FIGS. 11A and 11B, so that the combined parasitic capacity of the two diodes in series further decreases, and the reverse recovery period of the combined parasitic capacity is limited to the shorter one of the reverse recovery periods of the diodes. That is, in the present embodiment, in which satisfactory recovery characteristic is achieved and the parasitic capacity is reduced, as described in Embodiment 1 with reference to FIGS. 6A and 6B, the recovery current is further suppressed, whereby the loss and noise are further effectively reduced.

The above embodiments have been described on the assumption that the second predetermined value is greater than the first predetermined value. The two predetermined values both serve to prevent the reverse flow, and the first and second predetermined values may be so set as to be equal to each other. That is, in the present embodiment, second reference voltage Vr2 and first reference voltage Vr1 may be equal to each other.

Embodiment 3

Figure 12:
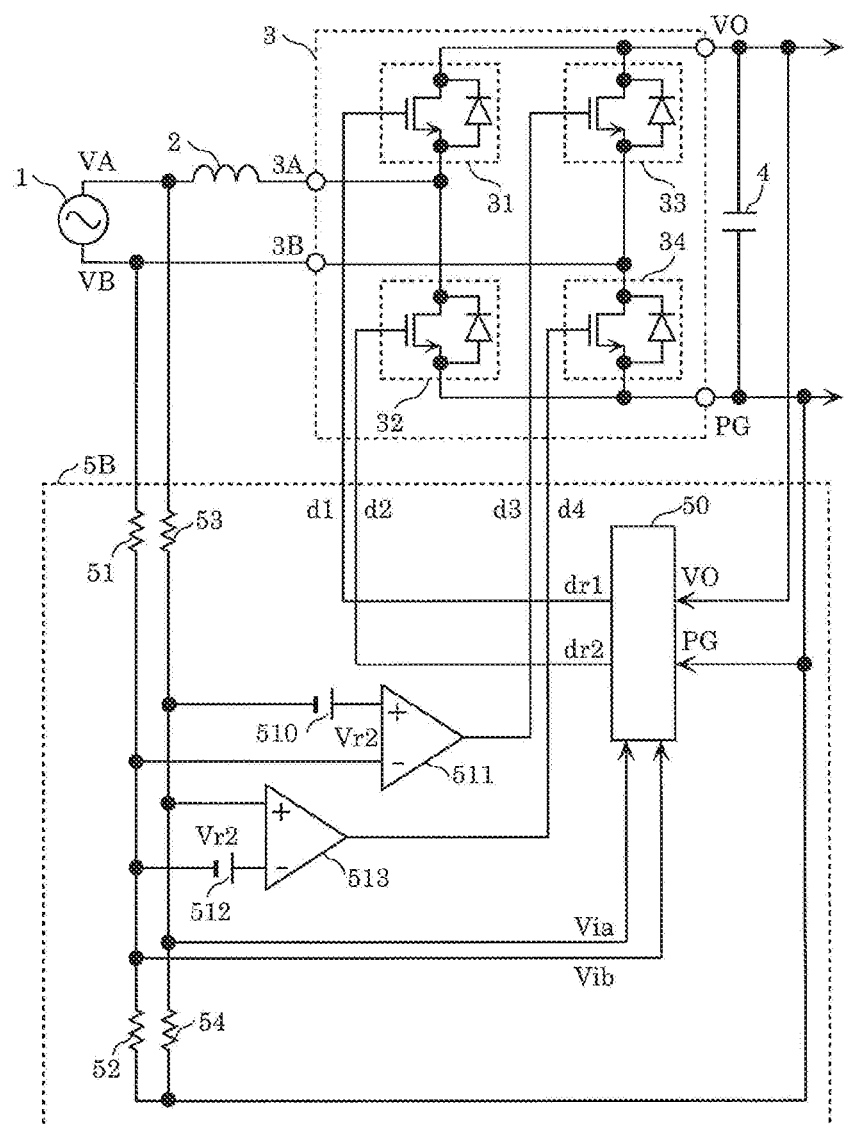
FIG. 12 is a circuit configuration diagram of a power-factor correcting converter according to Embodiment 3.

FIG. 12 is a circuit configuration diagram of a power-factor correcting converter according to Embodiment 3. In FIG. 12, the same components as those of the power-factor correcting converters according to Embodiment 1 shown in FIG. 1 and Embodiment 2 shown in FIG. 9 have the same reference numerals and will not be described. The power-factor correcting converter according to the present embodiment differs from the power-factor correcting converters according to Embodiments 1 and 2 in terms of the configuration of the control circuit, and the control circuit in the present embodiment is called control circuit 5B to be distinguished from control circuits in Embodiments 1 and 2. Control circuit 5B differs from control circuit 5A of the power-factor correcting converter according to Embodiment 2 in terms of the following points: That is, first reference voltage source 502, second reference voltage source 506, comparators 503 and 507, OR circuits 504 and 508, and AND circuits 505 and 509 are removed from control circuit 5B so that first drive signal d1 and second drive signal d2 are equal to first reference drive signal dr1 and second reference drive signal dr2, respectively. Instead, control circuit 5B is so configured that first reference drive signal dr1 turns on and off first higher-potential switch circuit 31, and second reference drive signal dr2 turns on and off first lower-potential switch circuit 32.

The operation of the thus configured power-factor correcting converter according to the present embodiment will be described with reference to FIGS. 13, 14A, and 14B.

Figure 13:
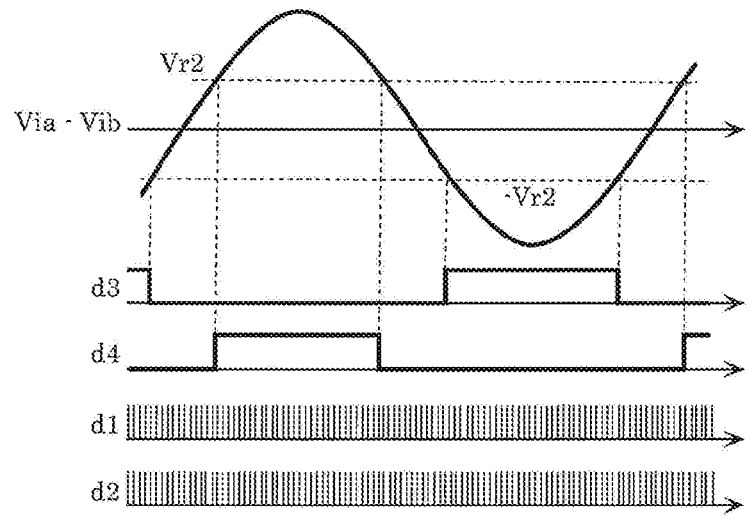
FIG. 13 shows waveforms of key parts of the operating power-factor correcting converter according to Embodiment 3.
Figure 14A:
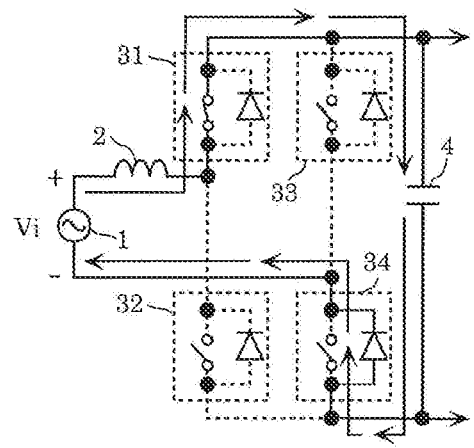
FIG. 14A shows the current path of the power-factor correcting converter according to Embodiment 3 in the case of the positive phase.
Figure 14B:
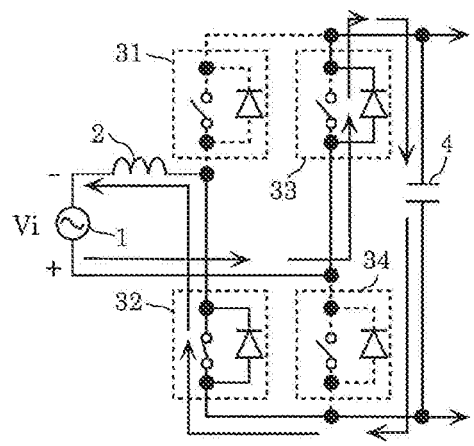
FIG. 14B shows the current path of the power-factor correcting converter according to Embodiment 3 in the case of the negative phase.
Figure 15A:
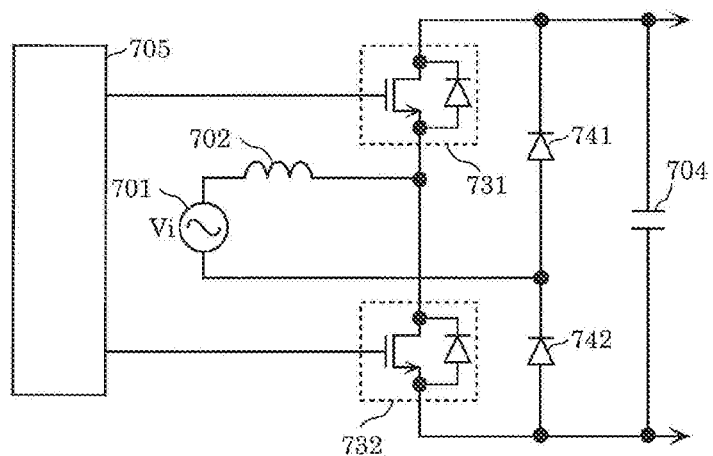
FIG. 15A is a circuit configuration diagram of the power-factor correcting converter described in Patent Literature 1.
Figure 15B:
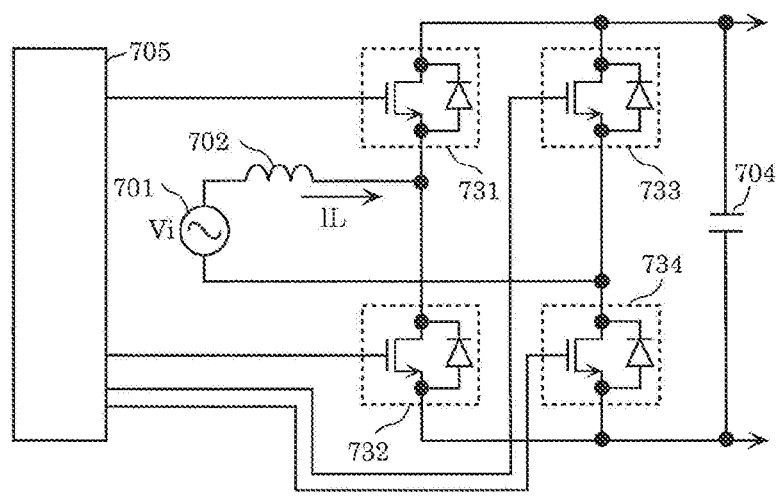
FIG. 15B is a circuit configuration diagram of the power-factor correcting converter described in Patent Literature 1.

FIG. 13 shows waveforms of key parts of the operating power-factor correcting converter according to Embodiment 3. FIG. 14A shows the current path of the power-factor correcting converter according to Embodiment 3 in the case of the positive phase, and FIG. 14B shows the current path of the power-factor correcting converter according to Embodiment 3 in the case of the negative phase. More specifically, FIG. 13 shows detection voltage Via–Vib proportional to input AC voltage Vi, second reference voltage Vr2, third drive signal d3, fourth drive signal d4, first drive signal d1, and second drive signal d2. FIG. 14A shows the inductor current discharge path in the vicinity of the input zero cross point in a case where the positive phase is expressed by 0<Via–Vib<Vr2 and the master switch operates in the turned-off state. On the other hand, FIG. 14B shows the inductor current discharge path in the vicinity of the input zero cross point in a case where the negative phase is expressed by 0<Vib–Via<Vr2 and the master switch operates in the turned-off state.

Control circuit 5B in the power-factor correcting converter according to Embodiment 3 compares the absolute value of input AC voltage Vi under detection with the second predetermined value and causing third drive signal d3 and fourth drive signal d4 to both have the low level in a case where the absolute value of input AC voltage Vi is smaller than the second predetermined value (|Via–Vib|<Vr2) as shown in FIG. 13. Control circuit 5B thus has the function of fixing second higher-potential switch circuit 33 and second lower-potential switch circuit 34, which form the second series circuit, to the turned-off state. The function described above allows one of the switch circuits of the second series circuits to be present as a diode in the inductor current flowing path during the on/off operation of the switch circuits of the first series circuit in the vicinity of the zero cross point of input AC voltage Vi where the absolute value of input AC voltage Vi is smaller than the second predetermined value, as shown in FIGS. 14A and 14B. The diode present in the path can therefore prevent the reverse flow of the inductor current. The effective value of the inductor current is thus reduced, whereby the conduction loss decreases, and the efficiency of the power-factor correcting converter can be improved.

The second predetermined value is desirably set at a value close to the voltage at which the inductor current starts flowing in the reverse direction. The second predetermined value is set in the same manner in which the first predetermined value in the power-factor correcting converter according to Embodiment 1 is set. Let E2 be the second predetermined value, $\delta_{max}$ be the maximum time ratio of the master switch circuit, and Vo be the output DC voltage, and second predetermined value E2 may be set as shown in Expression 5.

$$E2 \approx (1-\delta_{max}) \times Vo \qquad \text{(Expression 5)}$$

In the present embodiment, let R1 be the resistance of resistors 51 and 53, and R2 be the resistance of resistors 52 and 54, and the parameters are so set that Expression 6 is satisfied.

$$E2 = (1+R1/R2) \times Vr2 \qquad \text{(Expression 6)}$$

Second higher-potential switch circuit 33 and second lower-potential switch circuit 34, which form the second series circuit, also function to prevent the reverse flow in the present embodiment and are therefore desired to have small magnitudes of parasitic capacity and recovery current as well as low on-resistance. For example, as described in Embodiment 1, the switch circuits may each be a nitride semiconductor transistor having no structural body diode and having a unidirectional conduction mode in which the switch circuit operates as a reverse transistor to cause the channel to conduct current when the drain potential decreases to a predetermined threshold in the turned-off state in which the gate and the source form a short circuit or the voltage between the gate and the source is smaller than or equal to a threshold. In the unidirectional conduction mode, the transistor behaves as an anti-parallel diode similar to the body diode of a MOSFET, but no PN junction structure is present, and almost no carrier is present, whereby an ideal recovery characteristic with almost no reverse recovery period is achieved. Since a small amount of recovery current is produced when the transistor is operated as a diode as compared with the switch circuit of the related art, the loss and noise resulting from the recovery current are effectively reduced.

Other Embodiments

Although the power-factor correcting converter according to the present disclosure has been described with reference to Embodiments 1 to 3, the present disclosure is not limited to these embodiments. Those skilled in the art will be readily appreciated that various modifications of Embodiments 1 to 3 and combinations of the structural elements of the different embodiments are possible without materially departing from the novel teachings and advantages of the present disclosure. Accordingly, all such modifications and combinations are intended to be included within the scope of the present disclosure.

INDUSTRIAL APPLICABILITY

As described above, the power-factor correcting converters according to the present disclosure are useful as a power source circuit of a variety of electronic apparatuses to which electric power is supplied from a commercial AC power source.

What is claimed is:

1. A power-factor correcting converter comprising:
an inductor connected in series to an input AC power source that supplies input AC voltage via a first power source terminal and a second power source terminal;
a bridge circuit including four switch circuits each having a turned-on state in which bidirectional conduction is achieved and a turned-off state in which unidirectional conduction is achieved in accordance with a drive signal to a control terminal;
an output capacitor; and
a control circuit that turns on and off each of the four switch circuits,
wherein the bridge circuit includes
a first series circuit that is a circuit including a first higher-potential switch circuit and a first lower-potential switch circuit, the first higher-potential switch circuit and the first lower-potential switch circuit being connected to a first input terminal and connected in series to each other, and
a second series circuit that is a circuit including a second higher-potential switch circuit and a second lower-potential switch circuit, the second higher-potential switch circuit and the second lower-potential switch circuit being connected to a second input terminal and connected in series to each other, and
a series circuit including the inductor and the input AC power source is disposed between and connected to the first input terminal and the second input terminal in such a way that the first power source terminal is connected to the first input terminal or the second power source terminal is connected to the second input terminal,
the first series circuit, the second series circuit, and the output capacitor are connected in parallel to one another,
voltage across the output capacitor is output as output DC voltage, and
in a positive phase period of the input AC voltage when potential of the first power source terminal is higher than potential of the second power source terminal, the control circuit
(i) turns off the second higher-potential switch circuit, turns on the second lower-potential switch circuit, and turns on and off the first lower-potential switch circuit as a master switch, (ii) alternately turns on and off the first higher-potential switch circuit as a slave switch and the first lower-potential switch circuit when an absolute value of the input AC voltage is greater than a first predetermined value, and (iii) turns off the first higher-potential switch circuit that is the slave switch when the absolute value of the input AC voltage is smaller than or equal to the first predetermined value, and
in a negative phase period of the input AC voltage when the potential of the second power source terminal is higher than the potential of the first power source terminal, the control circuit
(i) turns on the second higher-potential switch circuit, turns off the second lower-potential switch circuit, and turns on and off the first higher-potential switch circuit as the master switch, (ii) alternately turns on and off the first lower-potential switch circuit as the slave switch and the first higher-potential switch circuit when the absolute value of the input AC voltage is greater than the first predetermined value, and (iii) turns off the second lower-potential switch circuit that is the slave switch when the absolute value of the input AC voltage is smaller than or equal to the first predetermined value.

2. The power-factor correcting converter according to claim 1,
wherein the first predetermined value is set at $(1-\delta_{max}) \times Vo$, where $\delta_{max}$ represents a maximum time ratio that is a maximum of a time ratio that is a proportion of a turned-on period to one switching cycle of the master switch that is the first lower-potential switch circuit in the positive phase period or the first higher-potential switch circuit in the negative phase period, and Vo represents the output DC voltage.

3. The power-factor correcting converter according to claim 1,
wherein the first higher-potential switch circuit and the first lower-potential switch circuit are each a transistor having the control terminal, a first terminal, and a second terminal,
the turned-on state is a state in which bidirectional conduction between the first terminal and the second terminal is achieved when voltage at the control terminal with respect to the first terminal is greater than or equal to a first threshold, and
the turned-off state is a state in which unidirectional conduction from the first terminal to the second terminal is achieved when the voltage at the control terminal is smaller than the first threshold and the voltage at the control terminal with respect to the second terminal is greater than or equal to a second threshold.

4. The power-factor correcting converter according to claim 3,
wherein the first higher-potential switch circuit and the first lower-potential switch circuit each include
a semiconductor laminate including a first nitride semiconductor layer disposed on a substrate and a second nitride semiconductor layer disposed on the first nitride semiconductor layer and having a bandgap wider than a bandgap of the first nitride semiconductor layer,
the control terminal disposed on the semiconductor laminate, and
the first terminal and the second terminal disposed on the semiconductor laminate and on opposite sides of the control terminal.

5. The power-factor correcting converter according to claim 4,
wherein the first nitride semiconductor layer comprises $In_XGa_{(1-X)}N$, where X is in a range from 0 to 1, inclusive, and
the second nitride semiconductor layer comprises $Al_YIn_ZGa_{(1-Y-Z)}N$, where each of Y and Z is in a range from 0 to 1, inclusive.

6. The power-factor correcting converter according to claim 4,
wherein the first higher-potential switch circuit and the first lower-potential switch circuit each include
no parasitic element that is disposed between the first terminal and the second terminal and operates as a diode.

7. The power-factor correcting converter according to claim 1,
wherein the control circuit turns off both the second higher-potential switch circuit and the second lower-potential switch circuit when the absolute value of the input AC voltage is smaller than or equal to a second predetermined value.

8. The power-factor correcting converter according to claim 7,
wherein the second predetermined value is so set as to be equal to the first predetermined value.

9. A power-factor correcting converter comprising:
an inductor connected in series to an input AC power source that supplies input AC voltage via a first power source terminal and a second power source terminal;
a bridge circuit including four switch circuits each having a turned-on state in which bidirectional conduction is achieved and a turned-off state in which unidirectional conduction is achieved in accordance with a drive signal to a control terminal;
an output capacitor; and
a control circuit that turns on and off each of the four switch circuits,
wherein the bridge circuit includes
a first series circuit that is a circuit including a first higher-potential switch circuit and a first lower-potential switch circuit, the first higher-potential switch circuit and the first lower-potential switch circuit being connected to a first input terminal and connected in series to each other, and
a second series circuit that is a circuit including a second higher-potential switch circuit and a second lower-potential switch circuit, the second higher-potential switch circuit and the second lower-potential switch circuit being connected to a second input terminal and connected in series to each other, and
a series circuit including the inductor and the input AC power source is disposed between and connected to the first input terminal and the second input terminal in such a way that the first power source terminal is connected to the first input terminal or the second power source terminal is connected to the second input terminal,
the first series circuit, the second series circuit, and the output capacitor are connected in parallel to one another,
voltage across the output capacitor is output as output DC voltage, and
in a positive phase period of the input AC voltage when potential of the first power source terminal is higher than potential of the second power source terminal, the control circuit
(i) alternately turns on and off the first lower-potential switch circuit as a master switch and the first higher-potential switch circuit as a slave switch, (ii) turns off the second higher-potential switch circuit and turns on the second lower-potential switch circuit when an absolute value of the input AC voltage is greater than a second predetermined value, and (iii) turns off both the second higher-potential switch circuit and the second lower-potential switch circuit when the absolute value of the input AC voltage is smaller than or equal to the second predetermined value, and
in a negative phase period of the input AC voltage when potential of the second power source terminal is higher than potential of the first power source terminal, the control circuit
(i) alternately turns on and off the first higher-potential switch circuit as the master switch and the first lower-potential switch circuit as the slave switch, (ii) turns on the second higher-potential switch circuit and turns off the second lower-potential switch circuit when the absolute value of the input AC voltage is greater than the second predetermined value, and (iii) turns off both the second higher-potential switch circuit and the second lower-potential switch circuit when the absolute value of the input AC voltage is smaller than or equal to the second predetermined value.

10. The power-factor correcting converter according to claim 9,
wherein the second predetermined value is set at $(1-\delta_{max}) \times Vo$, where $\delta_{max}$ represents a maximum time ratio that is a maximum of a time ratio $\delta$ that is a proportion of a turned-on period to one switching cycle of the master switch that is the first lower-potential switch circuit in the positive phase period or the first higher-potential switch circuit in the negative phase period, and Vo represents the output DC voltage.

11. The power-factor correcting converter according to claim 9,
wherein the second higher-potential switch circuit and the second lower-potential switch circuit are each a transistor having the control terminal, a first terminal, and a second terminal,
the turned-on state is a state in which bidirectional conduction between the first terminal and the second terminal is achieved when voltage at the control terminal with respect to the first terminal is greater than or equal to a first threshold, and
the turned-off state is a state in which unidirectional conduction from the first terminal to the second terminal is achieved when the voltage at the control terminal with respect to the first terminal is smaller than the first threshold and the voltage at the control terminal with respect to the second terminal is greater than or equal to a second threshold.

12. The power-factor correcting converter according to claim 11,
wherein the second higher-potential switch circuit and the second lower-potential switch circuit each include
a semiconductor laminate including a first nitride semiconductor layer disposed on a substrate and a second nitride semiconductor layer disposed on the first nitride semiconductor layer and having a bandgap wider than a bandgap of the first nitride semiconductor layer,
the control terminal disposed on the semiconductor laminate, and
the first terminal and the second terminal disposed on the semiconductor laminate and on both sides of the control terminal.

13. The power-factor correcting converter according to claim 12,
wherein the first nitride semiconductor layer comprises $In_XGa_{(1-X)}N$, where X is in a range from 0 to 1, inclusive, and
the second nitride semiconductor layer comprises $Al_YIn_ZGa_{(1-Y-Z)}N$, where each of Y and Z is in a range from 0 to 1, inclusive.

14. The power-factor correcting converter according to claim 12,
wherein the second higher-potential switch circuit and the second lower-potential switch circuit each include
no parasitic element that is disposed between the first terminal and the second terminal and operates as a diode.

* * * * *